Feb. 20, 1968     G. MIRAT ETAL     3,370,230

PULSE MEASURING SYSTEM

Filed Oct. 4, 1963     3 Sheets-Sheet 1

INVENTORS
GEORGES MIRAT
PAUL MIRAT
YVES PICHOFF
BY
Bacon & Thomas
ATTORNEYS

United States Patent Office 3,370,230
Patented Feb. 20, 1968

3,370,230
PULSE MEASURING SYSTEM
Georges Mirat, Bourg-La-Reine, Paul Mirat, Antony, and Yves Pichoff, Bourg-La-Reine, France, assignors to Commissariat à l'Energie Atomique, Paris, France
Filed Oct. 4, 1963, Ser. No. 313,975
Claims priority, application France, Oct. 4, 1962, 911,232; Oct. 26, 1962, 913,641; Nov. 2, 1962, 914,277
2 Claims. (Cl. 324—68)

The present invention relates to a method for measuring from a distance the amplitude of a pulse of very short duration as well as an extension of the method to the measurement of time-intervals between two very short pulses. It is known that, in order to determine a physical quantity, it is frequently necessary to measure the maximum amplitude of a pulse. It is also necessary in many cases to carry out this measurement at a fairly substantial distance from the location at which this pulse is generated. Technical considerations involving the transmission of pulses to the measuring instrument consequently present problems which are particularly difficult to solve when said pulses are of very short duration.

The present invention is directed to a method for pulse amplitude measurement which makes it possible to solve the problems set forth above as well as to devices for the practical application of said method.

This method consists in recording the maximum pulse amplitude in an electrostatic storage system, in producing in response to said pulse a voltage which rises in a substantially linear manner and in setting into operation an auxiliary periodic-voltage generator of the stable frequency type, in identifying an amplitude coincidence between the stored voltage and the rising voltage, in blocking the auxiliary generator by means of the amplitude coincidence signal, as well as in counting the total number of periods during which the auxiliary generator has operated, this number being proportional to the maximum amplitude of the pulse considered.

The invention makes use of a method of scanning of a capacitor-type electrostatic memory system by comparison of a voltage which is stored therein with a variable voltage according to a known law, said stored voltage representing, for example, the amplitude of a short pulse which it is desired to measure.

A conventional method of scanning capacitor-type electrostatic memory systems consists in comparing by means of a coincidence circuit the voltage which is stored in the capacitor with a voltage rising from zero which is known as a scanning voltage and is produced after the appearance of the voltage to be measured, said coincidence circuit supplying a pulse as soon as the voltages compared are equal. The scanning voltage is usually produced by a series circuit comprising a resistor and capacitor. Under these conditions, the equality of said voltage and of the voltage which is stored in the memory system takes place after a time interval which is not proportional to this latter voltage in consequence of the exponential law of increase of the scanning voltage.

In order to provide a remedy for this defect, use has been made of generators designed to produce an accelerating voltage which rises according to a strictly linear law. However, this improvement is not entirely satisfactory. The voltage which is stored in the capacitor-type electrostatic memory system is in fact not in itself strictly constant and undergoes a slight decrease according to an exponential law. As a consequence, and in spite of the perfect linearity of the scanning voltage, the equality of the voltages compared is still not achieved after a period of time which is proportional to the pulse amplitude which is measured.

The present invention combines the method hereinabove set forth with a method of scanning of a capacitor-type electrostatic memory system which is not subject to the drawback just referred-to which is inherent in methods of the prior art. The method of scanning in accordance with the invention is intended to generate a scanning voltage which varies according to a predetermined law so that equality of this voltage and of the voltage applied across the terminals of the electrostatic memory capacitor is achieved after a length of time which is strictly proportional to the pulse amplitude which is measured. The invention also relates to devices for the practical application of the above method.

The said method of scanning of a voltage which is preset in an electrostatic memory, the storage unit of which is a capacitor, is characterized in that a progressively rising voltage is impressed across the terminals of a second capacitor in series with a resistor, a direct-current voltage source is grounded through said resistor-capacitor assembly, and a second current component is superimposed on said resistor in addition to a first current component resulting from the capacitor charge by said direct-current voltage source to produce between the extremities of said resistor a voltage-correcting component which is proportional to and higher than the potential relative to ground of the point which is common to said resistor and to said capacitor. The progressively rising or scanning voltage thus obtained is then compared with the voltage which is stored in the memory system by means of a coincidence circuit.

In accordance with a particular mode of operation of the above method, this latter is characterized in that a progressively increasing voltage is developed across the terminals of a second capacitor, said resistor-capacitor assembly is coupled by a resistor, a direct-current voltage source is connected to ground, and a second current component is superimposed on said resistor in addition to a first current component resulting from the capacitor charge produced by said direct-current voltage source, and produces between the extremities of said resistor a voltage-correcting component which is proportional to and higher than the potential relative to ground of the point which is common to said resistor and to said capacitor. The progressively-increasing or scanning voltage thus obtained is then compared with the voltage which is stored in the memory system by means of a coincidence circuit.

In a first alternative form of embodiment, the extremities of the resistor of the capacitor-resistor assembly are joined together by an amplifier.

When it is desired to produce a device of this type by making use of transistors, the input impedance of the amplifier will in that case be too low and it will accordingly be found preferable to replace said amplifier by a second resistor and capacitor circuit. The object of this circuit is to produce the voltage-correcting component and to superimpose this latter on the main component resulting from the capacitor charge produced by the direct-current voltage source, in the resistance of the first resistor-capacitor circuit.

It can be seen that one of the advantages of the method in accordance with the invention is to permit the possibility of measurement from a distance. It is in fact merely necessary to transmit by means of a coaxial cable, for example, the sine signal derived from the auxiliary generator and to effect the counting of the half-waves of said signal. The problem of transmission then presents no difficulty.

The quantitative study of a physical process frequently comes down to the measurement of a time interval. This is especially the case in the field of nuclear physics when it is desired to know either the length of life or the transit time of a particle or else the time of decrement of a nuclear reaction, for example, the time intervals which are to be measured in that case ranging from values of one hundredth of a nanosecond to several microseconds.

Not only must these measurements be carried out with precision but they must also be very rapid. In the majority of cases, it is in fact necessary to ensure that the apparatus is able to carry out a large number of measurements over a given period for the purpose of collecting the maximum information.

The minimum time interval required between two signals successively applied to the apparatus in order that said signals should be correctly processed (namely the "dead time") must be as short as possible. The devices of the prior art do not have sufficiently short dead times, with the result that they do not make it possible to establish sufficiently rich statistics.

One of the applications of the method in accordance with the invention is the provision of a device for the accurate measurement of the short time interval which elapses between the initial moments of a so-called "initial pulse" and a so-called "final pulse," these pulses being mixed with stray pulses of relatively small amplitude, as well as the instruments for the practical application of the method which provides an extremely short dead time. It is merely necessary in this case to carry out a time-amplitude conversion and to measure this amplitude from a distance by means of the method of the invention. This time-amplitude conversion can be carried out by means of a linear-increase voltage generator which is triggered by the first pulse and blocked by the second pulse.

The device for measuring a short-time interval is characterized in that the incident pulses, the amplitude of which is smaller than an adjustable selection threshold are eliminated whereas the other incident pulses are amplified and shaped, each initial pulse and each final pulse being transmitted to the inputs of a time-amplitude converter over a time interval of fixed duration which is independent of the selection threshold level.

The device referred-to above is characterized in that each input line which transmits initial or final pulses is connected through two parallel channels comprising respectively on the one hand an amplifier followed by a delay system and on the other hand by a threshold selector at the inputs of a coincidence circuit which produces pulses controlling the linear-increase voltage generator which is employed for the purpose of carrying out the conversion.

Apart from these principal arrangements, the invention relates to certain secondary arrangements which will be mentioned below and which relate especially to the structural arrangement of the devices for the practical application of the method according to the invention as well as various modes of utilization of said devices.

The technical characteristics of the present invention will become more readily apparent from the following description of the devices referred-to above and the various instruments which make use of said devices, it being understood that said devices and said instruments do not have any limitative character as regards the modes of operation thereof or as regards the uses to which they may be applied.

Figure 1:
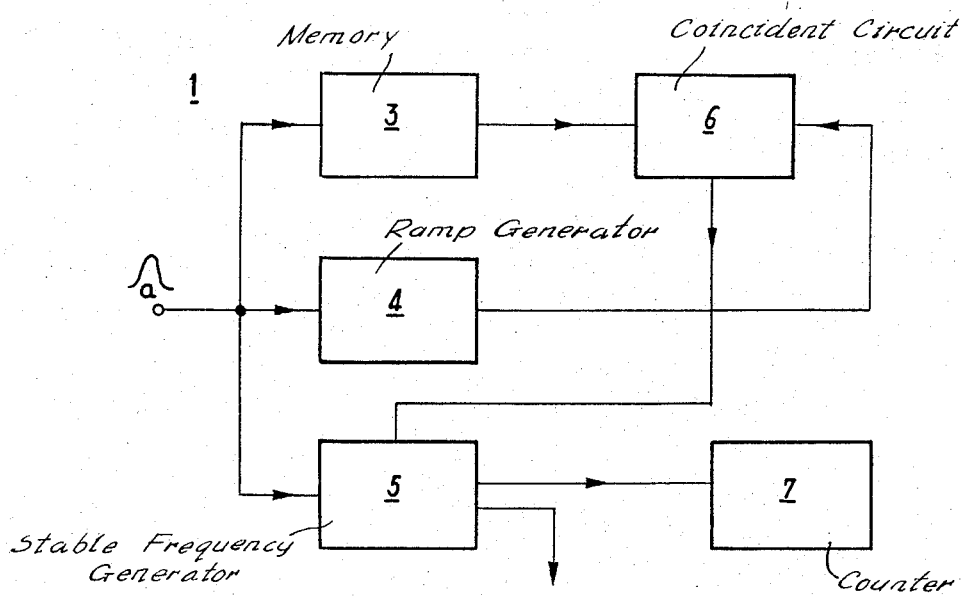
FIG. 1 is a block diagram of a device for the practical application of the method of voltage measurement in accordance with the invention.

The block diagram of FIG. 1 shows the functional arrangement of one example of practical operation of the invention. The pulse $a$ whose amplitude it is desired to measure is simultaneously transmitted to an electrostatic memory system 3, to a ramp generator 4 and a stable-frequency sinusoidal-voltage generator 5.

The two generators 4, 5 being triggered by said pulses, the voltages which appear at the output of the electrostatic memory system 3 and of the generator 4 are applied to a coincidence circuit 6 which supplies a pulse when equality of amplitude of the two voltages applied thereto is achieved. This latter pulse is transmitted to the sinusoidal-voltage generator 5 which is blocked by said pulse, said generator having been triggered by the pulse $a$. The sinusoidal voltage produced by the generator 5 is applied to a system 7 which effects the counting of cycles of said voltage. It will be understood that in order to obtain a sufficiently accurate measurement, the oscillation time of the voltage produced by the oscillator 5 must be small with respect to the duration of the time interval which is necessary in order that the amplitude of the voltage produced by the first generator should become equal to the amplitude which is measured. A derivative providing circuit is associated with the generator 4 in such manner that the triggering of the main generator takes place when the pulse amplitude reaches its maximum value. This makes it possible to avoid the systematic errors which would affect the results of measurements if pulses $a$ were applied having different rise times.

Figure 2:
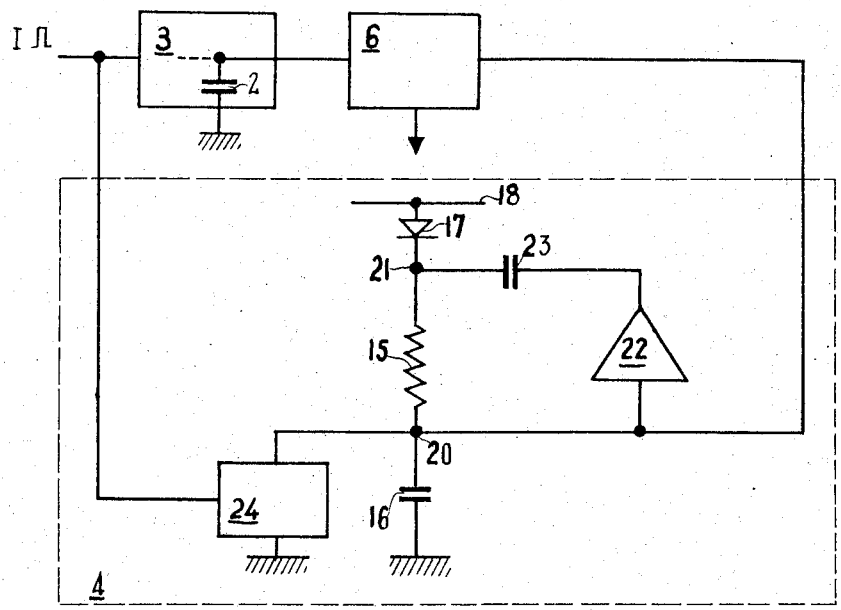
FIGS. 2 and 3 represent circuit diagrams of two preferred devices for the practical application of the method of scanning of an electrostatic memory system in accordance with the invention.

The block diagram of FIG. 2 illustrates the method in accordance with the invention and shows at the same time a system for the practical application of said method. A voltage pulse, the amplitude of which it is desired to measure, is applied to an electrostatic memory system 3 comprising a storage capacitor 2. The voltage which is stored in the memory system is transmitted to one of the inputs if a coincidence circuit 6, the second input of which receives the voltage derived from the generator 4 producing a scanning voltage which rises from zero, said generator being triggered by the application of a pulse to the input of the memory system 3. The equality of the voltage which is stored in said system and the voltage produced by said generator 4 induces a pulse at the output of the coincidence circuit 6.

The essential element of the generator 4 is a series circuit comprising a resistor 15 and capacitor 16 which connects the terminal 18 if a direct-current voltage source to ground via a diode 17. It should be noted that the polarity of the potential at said terminal must be identical with that of the pulses whose amplitude it is desired to measure. The point 20 which is common to the resistor 15 and to the capacitor 16 is connected to the junction 21 of said resistor and of the diode 17 by means of an amplifier 22 and a capacitor 23 in series.

That terminal of the capacitor 16 which is connected to the resistor 15 is normally grounded through the normally-conducting switch 24. The control element of said switch is connected to the input of the memory system 3, so that any incident pulse makes said switch non-conducting during a time-interval of pre-determined length.

It will be demonstrated by simple calculation that the time $t_1$ after which the voltage $U_g$ produced by the generator 4 becomes equal to the voltage $U_m$ which is applied by the memory system 1 to the coincidence circuit 6 is proportional to the amplitude $U_e$ of the incident pulse.

The notations employed hereinafter will be understood to have the following meanings:

$\tau$—the time constant of the electrostatic memory system;

R and C—the values respectively of the resistor 15 and of the capacitance of the capacitor 16;

E and $e_c$—the voltages respectively between the terminal 18 and ground and between the junction 20 and ground, the potential drop in the diode 17 being disregarded when said diode is conductive;

I—the current which flows through the resistor 15;

G—the gain of the amplifier 22.

The voltage applied by the memory system 3 to the coincidence circuit 6 is:

$$U_m = U_e e^{-\frac{t}{\tau}}$$

or by making use of the series development of the exponential function:

$$U_m = U_e\left(1 - \frac{t}{\tau} + \frac{t^2}{2!\tau^2} + \cdots + \frac{(-t)^n}{n!\tau^n}\right)$$

this may be written, with an error of less than $$\frac{1}{10,000}$$

$$U_m = U_e\left(1 - \frac{t}{\tau}\right) \quad (1)$$

provided that the inequality $$t \ll \frac{\tau}{100}$$

is satisfied. By employing the notations referred-to above, the voltage U between the points 21 and 20 may be written:

$$U = RI = (E + Ge_c) - e_c$$
$$= E + (G-1)e_c \quad (2)$$

Moreover, between the voltage $e_c$ and the current I, we have the relation:

$$\frac{de_c}{dt} = \frac{I}{C} \quad (3)$$

which makes it possible to give the Equation 2 the algebraic form:

$$-\frac{E}{1-G} + \frac{RC}{1-G}\frac{de_c}{dt} + e_c = 0 \quad (4)$$

$e_c$ being the unknown quantity, the solution of this equation is:

$$e_c = \frac{E}{1-G} + ae^{-\beta t} \quad (5)$$

The initial conditions make it possible to determine $\alpha$ and $\beta$.

At the time $t=0$ we in fact have $e_c = 0$ and $$I = \frac{E}{R}$$

Under these conditions:

$$a = -\left(\frac{E}{1-G}\right) \text{ and } \beta = \frac{1-G}{RC}$$

The supplementary condition $$\beta = \frac{2}{\tau}$$

allows the amplitude of the pulse to be measured (Ue) to be equated to the fraction $$\frac{t_1 E}{RC}$$

that is to make Ue proportional to $t_1$, or the number of cycles of periodic voltage produced by the generator 5 and counted by device 7.

Equation 5 is then written $$e_c = \frac{E}{1-G}\left(1 - e^{-\frac{1-G}{RC}t}\right)$$

and by making use of the limited development of the exponential function:

$$e_c = t\frac{E}{RC}\left(1 - \frac{1-G}{2RC}t\right) \quad (6)$$

Under these conditions, if the quantities G, R and C are determined in order that $$\beta = \frac{1-G}{RC}$$

should satisfy the relation $\beta = 2/\tau$ the Equations 1 and 6 show that the coincidence circuit 6 will produce a pulse when $$U_e = \frac{t_1 E}{RC}$$

that is to say, after a time interval $$t_1 = \frac{U_e RC}{E}$$

which is proportional to Ue. As can therefore be seen, it is possible by calculation to check the property which is claimed.

Figure 3:
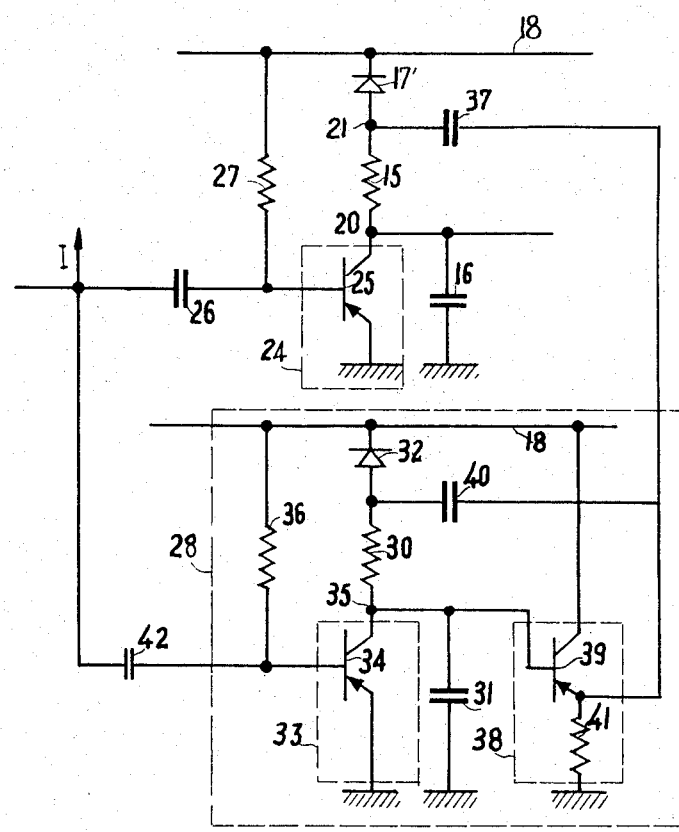

FIG. 3 is an electrical diagram of a transistor system for the practical application of the method according to the invention. It will be noted that similar elements in FIGS. 2 and 3 are designated by the same numerical references.

The essential element of the system of FIG. 3 is again a series circuit 15 comprising a resistor 15 and capacitor 16 which connects the ground (earth) to a terminal 18 of a direct-current voltage source, not shown, through the intermediary of a diode 17'. A switch 24 constituted by a transistor 25 which is mounted with emitter connected to ground (earth) is normally-conducting and shunts the capacitor 16 except after the arrival of an incident pulse. The collector of the transistor is connected to the junction 20 of the resistor 15 and capacitor 16 whilst the transistor base is connected to the input terminal of the system via the coupling capacitor 26. The correct polarization of the transistor is obtained by means of the resistor 27 which connects the base to the terminal 18.

The appearance of the component for correcting the voltage applied to the resistor 15 is produced by means of an auxiliary assembly 28 consisting of the series circuit 30–31 which comprises the resistor 30 and capacitor 31 and which connects terminal 18 to ground via the diode 32. In the same manner as the capacitor 16, capacitor 31 is shunted through a switch 33 constituted by a transistor 34 which is mounted with emitter connected to ground, said transistor being normally-conducting except after the arrival of an incident pulse. The collector of said transistor is connected to the junction 35 of the resistor 30 and capacitor 31 whilst the base of said transistor is connected to the input of the system via the coupling capacitor 42. The determination of the value of the resistance 36 makes it possible to polarize the base of said transistor in a correct manner. It should be noted that the diodes 17' and 32 are oriented according to the types of switching transistors 25 and 34. The auxiliary assembly 28 additionally comprises a feedback channel which produces the correcting current component which is fed into the resistor 15 through the coupling capacitor 37, said feedback channel joining the two ends of the resistor 30; said channel is constituted by the amplifier 38 comprising the transistor 39 and by the capacitor 40. A correct polarization of the electrodes of said transistor is obtained by joining its collector to the terminal 18 and by connecting its emitter to ground via the resistor 41; the collector of said transistor is connected to the capacitors 40, 37. The characteristics of the elements 30 and 31 of the auxiliary assembly 28 are determined so as to ensure that the ratio of the voltages taken from the terminals of the element 15 is equal to the gain 1 defined above.

What we claim is:

1. A system for measuring the maximum amplitude of a pulse including memory means for storing said pulse, generator means for producing in response to said pulse a ramp voltage which rises in substantially linear manner, auxiliary generator means for producing in response to said pulse a periodic voltage of stable frequency, means for comparing the amplitude of the stored pulse and ramp voltage and blocking said auxiliary generator means upon coincidence of amplitude, and means for counting the total number of periods which the auxiliary generator has been triggered, said generator means including a series circuit of a resistor and a capacitor through which a voltage source is connected to ground, a series circuit of an amplifier and a second capacitor associated in parallel with said resistor to produce a corrector component of current, a normally conducting switch shunting said first capacitor to ground, input circuit means for rendering said switch non-conducting for a predetermined time interval after the arrival of said pulse to be measured, and output circuit means joining the junction of said resistor and first capacitor to said comparing means.

2. A system for measuring the maximum amplitude of a pulse including memory means for storing said pulse, generator means for producing in response to said pulse a ramp voltage which rises in substantially linear manner, auxiliary generator means for producing in response to said pulse a periodic voltage of stable frequency, means for comparing the amplitude of the stored pulse and ramp voltage and blocking said auxiliary generator means upon coincidence of amplitude, and means for counting the total number of periods which the auxiliary generator has been triggered, said generator means including a series circuit of a first resistor and a first capacitor through which a voltage source is connected to ground, a series circuit of a second resistor and a second capacitor through which said voltage source is also connected to ground, a series circuit of a transistorized amplifier and a third capacitor associated in parallel with said second resistor, the output of said amplifier also being coupled through a fourth capacitor to the voltage source end of said first resistor whereby the amplifier applies thereto a corrector component of current, a first switch normally conducting to shunt said first capacitor to ground, a second switch normally conducting to shunt said second capacitor to ground, input circuit means for rendering said switches non-conducting for a predetermined time interval after the arrival of said pulse to be measured, and output circuit means joining the junction of said first resistor and first capacitor to said comparing means.

References Cited

UNITED STATES PATENTS

| | | | |
|---|---|---|---|
| 2,473,208 | 6/1949 | Larsen | 328—184 |
| 2,835,809 | 5/1958 | Taylor | 328—184 X |
| 2,976,487 | 3/1961 | Cohen | 324—68 |
| 2,994,825 | 8/1961 | Anderson. | |
| 3,007,113 | 10/1961 | Kreinberg | 324—68 |
| 3,012,195 | 12/1961 | Slocomb et al. | 324—103 |
| 3,013,208 | 12/1961 | Voznak | 324—68 |
| 3,050,686 | 8/1962 | Korff et al. | 328—184 X |
| 3,127,565 | 3/1964 | Williams | 324—103 |
| 3,140,477 | 7/1964 | Germain | 324—103 |
| 3,275,847 | 9/1966 | Kitchin | 328—184 X |

RUDOLPH V. ROLINEC, *Primary Examiner.*

WALTER L. CARLSON, *Examiner.*

P. F. WILLE, *Assistant Examiner.*